3,089,944
ARC WELDING

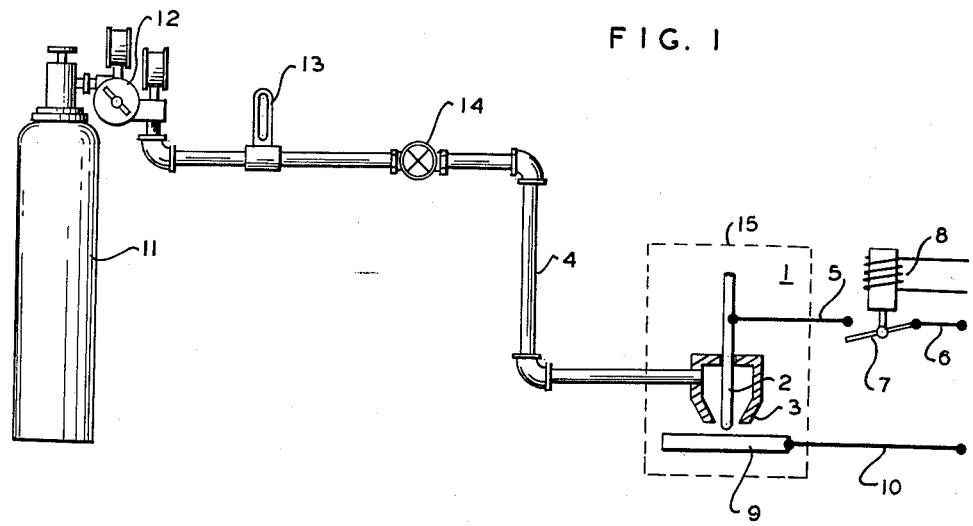
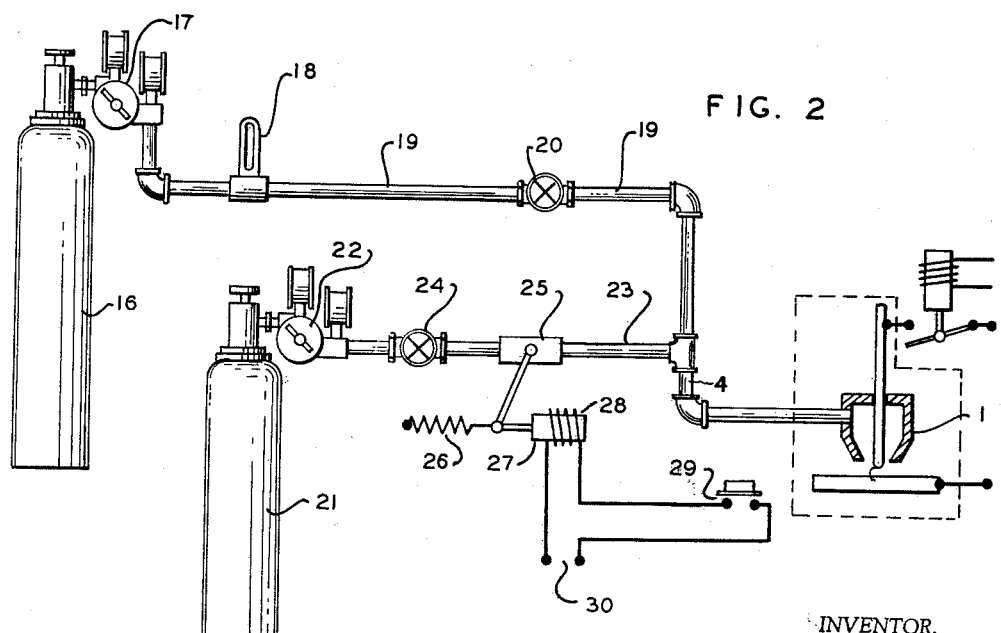

Howard Hume Mathews, Mountain Lakes, N.J., assignor to Air Reduction Company, Incorporated, New York, N.Y., a corporation of New York
Continuation of application Ser. No. 851,284, Nov. 6, 1959. This application Jan. 19, 1962, Ser. No. 168,579
4 Claims. (Cl. 219—74)

My invention relatives primarily to the starting and maintenance of power arcs used in arc welding, arc cutting, and like metal working operations, but is applicable to the starting and maintenance of any power arc irrespective of the use made of it.

My innvention is of particular utility in starting a welding arc between a non-consumable electrode and a work-part in an inert shielding gas such as argon or helium. It comprises adding a radioactive gas to the shielding gas to ionize the gap between the electrode and the workpart so that the arc supply voltage employed for maintaining the welding arc across an operating arc gap is adequate in itself for starting the arc across said gap. In this manner the welding arc may be promptly started without employing the mechanical and electrical equipment heretofore employed for arc starting in order to avoid touching the electrode to the workpart and withdrawing it therefrom which results in an undesirable rapid consumption of the electrode and an undesirable contamination of the electrode and the workpart each with the metal of the other.

It is frequently a requirement in arc welding that the arc be promptly initiated when an arc sustaining supply voltage is applied across cooperating electrodes between the arcing terminals of which the arc is formed. Thus in machine operations in which the welding operation is one of a sequence of operations that are performed on a workpart, prompt starting of the arc is essential in order to maintain the desired time pattern of the sequence of operations. Also in operations where a plurality of welds are to be made simultaneously, it is desirable that all of the welding arcs start in unison for if the variations in starting time are large, late arc starts will result in incomplete welds and early arc starts will result in burn-throughs.

The starting time of a welding arc is subject to wide variations and may require as much time as a second or two. This time lag includes the time needed to initiate an electric discharge and the time needed to form the arc which latter time under certain conditions may be of very short duration. The initiation of the arc discharge depends upon the presence of free electrons in the arc gap. Otherwise statistical time lags will occur even though the potential difference across the arc gap between the electrodes may exceed the normal breakdown voltage of the arc gap.

Where the arc is established between an electrode and a workpart constituting a cooperating electrode, prompt starting of the welding arc may be obtained by touching electrode to the workpart to complete the welding circuit and then withdrawing the electrode from the workpart to strike the arc. This method of arc starting can not be used however in certain forms of arc welding. Thus, for example, when welding in a substantially inert shielding gas with an arc struck between a tungsten electrode and the workpart, touch starting is not satisfactory because it results in a rapid consumption of the electrode and in contamination of the electrode and the workpart each with the metal of the other.

Several arrangements have been employed in the past to avoid touch arc starting and with the hope of obtaining a prompt initiation of the welding arc. In all cases, dependence has been placed in ionizing the gas in the arc gap by heat, light, or the emanations from radioactive solid materials. Thus the arc gap may be ionized by a high voltage high frequency spark discharge between the main electrode and the workpart or between the main electrode and an auxiliary electrode or a pilot arc may be established between the main electrode and an auxiliary electrode connected in a circuit in shunt to the main arc gap and through which a limited amount of current is allowed to flow from the arc source of supply. It has also been proposed to ionize the gas in the path of the arc by causing the arc shielding gas to pass through the field of emissions from a radioactive solid which is separate from the electrode and spaced away from the region of the arc. This is not an effective way of using the radioactive material since recombination of the ion pairs thus formed can occur before the gas arrives at the arc gap where its ionization is required for initiating the flow of arc current. Furthermore, where the field of emissions is spaced from the arc gap as has been proposed, emitters of low energy beta particles cannot produce the desired ionization of the gas in the arc gap.

As indicated above, it is an object of my invention to use radioactive gases for promptly initiating a power arc in the gap between cooperating electrodes upon the application of an arc sustaining supply voltage to these electrodes and in certain circumstances also for stabilizing the arc once it has been formed.

In practicing my invention radioactive gases such as hydrogen-3 and krypton-85 are introduced into the gap between cooperating electrodes to ionize the gaseous medium of the gap prior to energizing the electrodes with an arc sustaining supply voltage which will cause arc current flow and initiate the arc which is thereafter maintained by said voltage with or without the assistance of the radioactive gas.

Two arrangement for practicing my invention have been illustrated in the accompanying drawing in which:

FIG. 1 shows apparatus for supplying to a gas-arc welding torch a suitable shielding gas containing an ionizing trace of a radioactive gas and;

FIG. 2 shows apparatus in which a radioactive gas is supplied to a stable form of shielding gas as it is being supplied to the gas-arc welding torch.

In FIG. 1 of the drawing, a gas shielded arc welding torch is diagrammatically represented at 1 and comprises an electrode 2 mounted in a nozzle 3 to which a shielding gas is supplied through a pipeline 4. The electrode may be formed of tungsten and the shielding gas may be an inert gas such as argon or helium which is discharged from the torch nozzle about the arcing end of the electrode which is at or projects through the discharge orifice of the nozzle.

One terminal of a source of welding current is connected to the electrode of the welding torch through conductors 5 and 6 and the contacts of a welding circuit contactor 7 having an operating winding 8 and the other terminal of this source is connected to the workpart 9 through a conductor 10. When the welding contactor 7 is closed by energization of its operating winding 8, arc welding voltage is applied between the electrode 2 and the workpart 9 and if these cooperating electrodes are spaced from one another by an operating arc gap, a welding arc once established can be maintained between the electrode and the workpart.

The time lag in arc starting will be reduced and made more uniform in accordance with my invention by supplying to nozzle 3 of the welding torch through the pipeline 4 a suitable shielding gas containing a trace of a radioactive gas such as hydrogen-3 or krypton-85. A compressed supply of this activated shielding gas is contained in a cylinder 11 from which it is supplied through a pressure regulator 12, a flowmeter 13, a control valve 14, and the pipeline 4 to the nozzle 3 of the welding torch. During welding this activated inert gas is supplied as a shield about the supporting terminal of the electrode, the arc between the electrode and the workpart, and the portions of the workpart rendered molten by the arc.

Since it may be necessary to protect the operator from the health hazards attached to the use of a radioactive gas in significant quantity, the welding torch and its associated apparatus may be enclosed in a chamber indicated by dotted lines in FIG. 1. In such case the welding torch preferably forms part of a fully automatic welder and the chamber may be suitably ventilated to dissipate the radioactive gas or provide for its recovery.

In FIG. 2 of the drawing, the radioactive gas is supplied to a stable shielding gas prior to supplying the mixture thus formed to the gas-arc welding torch. Means are also provided so that the operator can at his volition supply or interrupt the supply of radioactive gas to the stable shielding gas. Thus in direct current welding, the radioactive gas may be supplied only during arc starting whereas in alternating current welding, where deionization of the arc gap occurs at half cycle intervals when the welding current passes through zero, it may be desirable to supply the radioactive gas continuously in order to stablize the arc action.

As shown in FIG. 2, a stable shielding gas, for example argon, is supplied through a pressure regulator 17, a flowmeter 18, a pipeline 19 including a control valve 20 and the pipeline 4 to the welding torch 1 from a compressed supply of this gas in a cylinder 16. Radioactive gas is supplied to pipeline 4 for admixture with this stable gas through a pressure regulator 22 and a pipeline 23, including a control valve 24 and an electrically controlled shut-off valve 25, from a pressure cylinder 21 containing this gas. Valve 25 is biased to its closed position by a spring 26 acting through a lever on its valve stem and is operated to its open position by a relay 27 having an operating winding 28 which when energized causes the relay to overcome the bias of spring 26 and open the valve. The operating winding 28 of relay 27 is energized at the will of the operator by closing a switch 29 which completes a circuit that connects the relay winding 28 across a source of supply voltage 30.

The welding torch 1 and the mechanical and electrical parts associated therewith are in FIG. 2 the same as illustrated in FIG. 1 and described above.

Hydrogen-3 (tritium) emits only beta particles at a low energy level. The energy level is so low that glass of 1 mm. wall thickness provides complete protection of the operator. One millilitre of hydrogen-3 contains 2.58 curies of radioactivity. Hydrogen-3 has a half-life of 12.46 years.

Krypton-85 has a half-life of 10.27 years. It provides both beta and gamma radiations. One curie of pure krypton-85 will occupy a volume of 0.6 millilitre. Krypton-85 is a rare gas and cannot exchange with other isotopes present in compounds within the human body. Consequently, the health hazard through inhalation is restricted to the effect of the beta and bamma rays during their rapid passage through the lungs of the human body. Pyrex glass 1.2 mm. thick will completely absorb the beta rays emitted by krypton-85. However, gamma rays are also emitted by krypton-85 and consequently a ¼″ thick lead sheet would be required to cut down the radiation tolerance of 1 curie to the minimum permissible level at 20 cm. from the source.

Other radioactive gases that may be used in practicing my invention are xenon-133 and argon-37 having half-lives respectively of 5.27 days and 35 days. Because of the short half-lives of these radioactive gases, they are not as acceptable for my purposes as krypton-85 above referred to but they are rare gases and as such possessed of the advantage of krypton-85. Under some circumstances chlorine-36 may be used in the arc shielding gas. It has a half-life of $3.08 \times 10^5$ years. Gaseous compounds of non-gaseous radioactive isotopes may also be used, one example being gaseous carbon dioxide formed from carbon-14. Carbon-14 has a half-life of $5.57 \times 10^3$ years and provides only beta radiations. All of the above radioactive gaseous isotopes are manufactured products produced for example by reactions in an atomic pile. Naturally occurring radioactive gases such as radon may be used but the cost thereof may be prohibitive for most welding operations unless means are provided for recovering the radioactive gas after it has been used for its arc starting purpose. The other radioactive gases used in practicing my invention may also be recovered and reused when it is economical to do so.

From what has been stated above, it is quite obvious that various radioactive gases may be used in accordance with my invention for ionizing stable arc shielding gases or mixtures thereof used in performing arc welding operations. It is also obvious that my invention may be employed for starting high pressure arcs used in arc cutting and for purposes other than for arc welding or cutting where it is desirable to reduce and render more uniform the time lag in starting such arcs.

This application is a continuation of my prior copending application Serial No. 851,284, filed November 6, 1959, now abandoned.

I claim:

1. The method of reducing the time lag in starting an electric power arc in a stable gas at atmospheric pressure across a gap between cooperating electrodes which are connected in circuit with a source of voltage which will maintain an arc across said gap after it has been initiated, said method comprising supplying a radioactive gas to said gap between said electrodes in sufficient quantity to produce arc starting ionization of the stable gaseous medium in said gap and the consequent prompt initiation of an arc across said gap and interrupting said supply of radioactive gas to said gap after said arc has been initiated.

2. In electric arc welding with an arc established between an electrode and a workpart in a flowing stream of stable gas which is supplied about the terminal portion of said electrode, said arc, and the molten weld metal produced in the workpart by said arc, the method of reducing the time lag encountered in starting an arc across the gap between said electrode and said workpart when applying thereto an arc starting and sustaining voltage which comprises ionizing said stable gas by adding thereto a radioactive gas, supplying the mixture of said stable gas and said radioactive gas to the arc gap between said electrode and said workpart, and interrupting the supply of radioactive gas to said stable gas after an arc has been initiated between said electrode and said workpart.

3. In electric arc welding with an arc established between an electrode and a workpart in a flowing stream of stable gas which is supplied about the terminal portion of said electrode, said arc and the molten weld metal produced in the workpart by said arc, the method of reducing the time lag encountered in starting an arc across the gap between said electrode and said workpart when applying thereto an arc starting and sustaining voltage which comprises starting said arc in an atmosphere of stable gas ionized by radioactive gas supplied in admixture therewith and maintaining said arc after initiation in an atmosphere consisting wholly of stable gas.

4. In gas shielded electric arc welding of the type in which an arc is established between an electrode and a workpart in an atmosphere of shielding gas delivered as a flowing stream to the arc gap between said electrode and said workpart from a source of supply remote from said electrode and said workpart, the improvement which comprises providing as the arc shielding gas delivered from said source of supply a stable gas having mixed therein a radioactive gas in an amount to continuously maintain said stable gas in an ionized condition at an ionization level above the minimum required to reduce the time lag encountered in starting an arc across the gap between said electrode and said workpart when applying thereto an arc starting and sustaining voltage.

References Cited in the file of this patent

UNITED STATES PATENTS 2,646,492     Ballard  ---------------- July 21, 1953